US012631757B2

(12) United States Patent
Hurwitz et al.

(10) Patent No.: US 12,631,757 B2
(45) Date of Patent: May 19, 2026

(54) CONTINUOUS WAVE TIME OF FLIGHT SYSTEM

(71) Applicant: Analog Devices International Unlimited Company, Limerick (IE)

(72) Inventors: Jonathan Ephraim David Hurwitz, Edinburgh (GB); Krystian Balicki, Wroclaw (PL); Eoin E. English, Pallasgreen (IE)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 18/661,478

(22) Filed: May 10, 2024

(65) Prior Publication Data

US 2024/0295657 A1 Sep. 5, 2024

Related U.S. Application Data

(63) Continuation of application No. 17/316,285, filed on May 10, 2021, now Pat. No. 12,000,931.

(Continued)

(51) Int. Cl.
*G01S 17/894* (2020.01)
*G01B 11/22* (2006.01)
(Continued)

(52) U.S. Cl.
CPC ............ *G01S 17/894* (2020.01); *G01B 11/22* (2013.01); *G01S 7/4814* (2013.01); *G01S 7/4816* (2013.01);
(Continued)

(58) Field of Classification Search
CPC .... G01S 17/894; G01S 7/4814; G01S 7/4816; G01S 7/4911; G01S 7/491; G01S 17/36;
(Continued)

(56) References Cited

U.S. PATENT DOCUMENTS

| | | | |
|---|---|---|---|
| 7,791,715 B1 | 9/2010 | Bamji | |
| 9,749,565 B2 | 8/2017 | Barnes et al. | |

(Continued)

FOREIGN PATENT DOCUMENTS

| | | |
|---|---|---|
| CN | 110221274 A | 9/2019 |
| WO | 2020095603 A1 | 5/2020 |

OTHER PUBLICATIONS

Office Action in CN202110526156.3, mailed Sep. 18, 2023, 12 pages.

(Continued)

*Primary Examiner* — Michael E Teitelbaum
(74) *Attorney, Agent, or Firm* — ArentFox Schiff LLP

(57) ABSTRACT

The present disclosure relates to a lower energy/faster time of flight camera system configured to measure distance to an object. The system is configured to emit laser light modulated with a first frequency and image light reflected by an object in order to determine a first phase difference between the emitted and reflected light. It then emits laser light modulated with a second frequency and images light reflected by the object to determine a second phase difference between the emitted and reflected light. The distance to the object is determined using the first and second phase differences. The system operates at lower energy for obtaining the first phase difference compared with the operation to obtain the second phase difference. This results in lower overall energy consumption, and potentially also faster overall operation, compared with previous continuous wave time of flight systems, without any significant reduction in accuracy of imaging.

18 Claims, 9 Drawing Sheets

Related U.S. Application Data

(60) Provisional application No. 63/025,393, filed on May 15, 2020.

(51) Int. Cl.

| | |
|---|---|
| *G01S 7/481* | (2006.01) |
| *G01S 7/4911* | (2020.01) |
| *H04N 25/44* | (2023.01) |
| *H04N 25/46* | (2023.01) |
| *H04N 25/709* | (2023.01) |
| *H04N 25/78* | (2023.01) |

(52) U.S. Cl.

CPC ............ *G01S 7/4911* (2013.01); *H04N 25/44* (2023.01); *H04N 25/46* (2023.01); *H04N 25/709* (2023.01); *H04N 25/78* (2023.01)

(58) Field of Classification Search

CPC ........ G01S 17/32; G01S 7/481; G01S 7/4913; G01B 11/22; H04N 25/44; H04N 25/46; H04N 25/709; H04N 25/75; H04N 25/78

See application file for complete search history.

(56) References Cited

U.S. PATENT DOCUMENTS

| | | | | |
|---|---|---|---|---|
| 10,764,518 | B2 | 9/2020 | Van Dyck et al. | |
| 2012/0075534 | A1 | 3/2012 | Katz et al. | |
| 2015/0285625 | A1 | 10/2015 | Deane | |
| 2016/0231419 | A1 | 8/2016 | Gusev | |
| 2017/0068393 | A1* | 3/2017 | Viswanathan | ....... H04N 9/3161 |
| 2017/0272651 | A1 | 9/2017 | Mathy et al. | |
| 2018/0278843 | A1 | 9/2018 | Smith et al. | |
| 2018/0299554 | A1 | 10/2018 | Van Dyck et al. | |
| 2019/0094342 | A1 | 3/2019 | Hiramatsu et al. | |
| 2019/0227169 | A1 | 7/2019 | Wong | |
| 2019/0306472 | A1* | 10/2019 | Buettner | ................ H04N 25/46 |
| 2019/0383946 | A1 | 12/2019 | Namba | |
| 2020/0033456 | A1 | 1/2020 | Wang et al. | |
| 2020/0393245 | A1* | 12/2020 | Ortiz Egea | ............ H04N 23/81 |
| 2021/0037204 | A1* | 2/2021 | Moon | .................... H04N 25/42 |
| 2021/0081040 | A1* | 3/2021 | Sengelaub | ............. H04N 23/90 |

OTHER PUBLICATIONS

Second Office Action for Chinese Application No. 202110526156.3, dated Apr. 16, 2024 (15 pages).

\* cited by examiner

CONTINUOUS WAVE TIME OF FLIGHT SYSTEM

CROSS REFERENCE TO RELATED APPLICATIONS

This application is a continuation of U.S. application Ser. No. 17/316,285, filed on May 10, 2021, which claims the benefit of U.S. Provisional Application No. 63/025,393, filed on May 15, 2020, and entitled "CONTINUOUS WAVE TIME OF FLIGHT SYSTEM," both of which are incorporated by reference herein in their entireties.

BACKGROUND

Time-of-flight (ToF) camera systems are range imaging systems that resolve the distance between the camera and an object by measuring the round trip of light emitted from the ToF camera system. The systems typically comprise a light source (such as a laser or LED), a light source driver to control the emission of light from the light source, an image sensor to image light reflected by the subject, an image sensor driver to control the operation of the image sensor, optics to shape the light emitted from the light source and to focus light reflected by the object onto the image sensor, and a computation unit configured to determine the distance to the object based on the emitted light and the corresponding light reflection from the object.

In a Continuous Wave (CW) ToF camera system, multiple periods of a continuous light wave are emitted from the laser. The system is then configured to determine the distance to the imaged object based on a phase difference between the emitted light and the received reflected light. CW ToF systems often modulate the emitted laser light with a first modulation signal and determine a first phase difference between the emitted light and reflected light, before modulating the emitted laser light with a second modulation signal and determine a further phase difference between the emitted light and reflected light. A depth map/depth frame can then be determined based on the first and second phase differences. The first modulation signal and second modulation signals have different frequencies so that the first and second phase differences can be used to resolve phase wrapping.

During the time that it takes to emit the laser light and read-off the charge stored on the image sensor after each light emission, it is possible that the object being imaged will have moved, which may cause inaccuracies and/or blurring in the generated image frame. Furthermore, driving the (often relatively high power) laser, and performing multiple readout operations of the pixels of the image sensor, consumes a relatively large amount of power. Therefore, a faster and/or lower energy CW ToF camera system is desirable.

SUMMARY OF THE DISCLOSURE

The present disclosure relates to a lower power/faster time of flight camera system configured to measure distance to an object. The system is configured to emit laser light modulated with a first frequency and image light reflected by an object in order to determine a first phase difference between the emitted and reflected light and separately at a different time (either before or after the process involving laser modulation with the first frequency) emit laser light modulated with a second frequency and images light reflected by the object to determine a second phase difference between the emitted and reflected light. The distance to the object is determined using the first and second phase differences. The system is arranged to operate at lower energy for obtaining the first phase difference compared with the operation to obtain the second phase difference. This results in lower overall energy consumption, and potentially also faster overall operation, compared with previous continuous wave time of flight systems, without any significant reduction in accuracy of imaging.

In a first aspect of the disclosure there is provided a continuous wave time of flight, CW-ToF, camera system comprising: a laser for outputting laser light; an imaging sensor comprising a plurality of imaging pixels for accumulating charge based on incident light comprising reflected laser light; and an image acquisition system coupled to the imaging sensor and configured to: acquire a first set of charge samples from the imaging sensor by: a) driving the laser to output laser light modulated with a first modulation signal, wherein the first modulation signal has a first frequency; and b) after step a, reading out image sensor values indicative of charge accumulated by at least some of the plurality of imaging pixels of the imaging sensor; acquire a second set of charge samples from the imaging sensor by: c) driving the laser to output laser light modulated with a second modulation signal, wherein the second modulation signal has a second frequency, and wherein the second frequency is greater than the first frequency; and d) after step c, reading out image sensor values indicative of charge accumulated by at least some of the plurality of imaging pixels of from the imaging sensor; and determine a depth frame based on the first set of charge samples and the second set of charge samples; wherein the CW-ToF camera system is operated in a relatively low energy mode for acquiring the first set of charge samples compared with the acquiring of the second set of charge samples. The first set of charge samples may be acquired before or after the second set of charge samples.

The relatively low energy mode may comprise: in step b), reading out image sensor values from a first set of imaging pixels of the imaging sensor; and in step d), reading out image sensor values from a second set of imaging pixels of the imaging sensor, wherein the first set of imaging pixels comprises fewer imaging pixels than the second set of imaging pixels.

The relatively low energy mode may comprise, when acquiring the first set of charge samples: binning the image sensor values of groups of two or more imaging pixels, such that each of the first set of charge samples comprises a plurality of binned pixel values. Step b) may comprise: binning, in the analog domain, image sensor values of groups of two or more imaging pixels; and digitally converting the plurality of binned pixel values.

The image acquisition system may be further configured to determine a depth frame based on the first set of charge samples and the second set of charge samples, and wherein determining the depth frame comprises up sampling the first set of charge samples.

The image acquisition system may be further configured to determine a depth frame based on the first set of charge samples and the second set of charge samples, wherein determining the depth frame comprises: using the first set of charge samples to determine phase differences between the output laser light modulated with a first modulation frequency and light incident on the imaging sensor; and upsampling the determined phase differences between the output laser light modulated with a first modulation frequency and light incident on the imaging sensor.

The relatively low energy mode may comprise driving the laser such that an optical power of the output laser light modulated with the first modulation signal is lower than an optical power of the output laser light modulated with the second modulation signal.

The image acquisition system may comprise one or more amplifiers for amplifying signals read from the imaging sensor, and wherein the image acquisition system is configured to: operate at least some of the one or more amplifiers in a first power mode when acquiring the first set of charge samples; and operate at least some of the one or more amplifiers in a second power mode when acquiring the second set of charge samples, wherein the first power mode is lower than the second power mode.

The image acquisition system may comprise one or more analog-to-digital converters, ADC, for converting analog signals read from the imaging sensor to digital signals, and wherein the image acquisition system is configured to: operate at least some of the ADCs in a first power mode when determining at least some of the first set of samples; and operate at least some of the ADCs in a second power mode when determining at least some of the second set of samples, wherein the first power mode is lower than the second power mode.

The relatively low energy mode may comprise: repeating steps a) and b) a first plurality of times such that the acquired first set of charge samples comprises a first plurality of charge samples; and repeating steps c) and d) a second plurality of times such that the acquired second set of charge samples comprises a second plurality of charge samples, wherein the first plurality is less than the second plurality, such that the first plurality of charge samples comprises fewer charge samples than the second plurality of charge samples.

The relatively low power mode may comprise: driving the laser in steps a) and c) such that laser light is output from the laser during step a) for a shorter period of time than laser light is output from the laser during step c).

The image acquisition system may be further configured to determine a depth frame based on the first set of charge samples and the second set of charge samples.

The image acquisition system may be further configured to output the first set of charge samples and the second set of charge samples to a processor for determination of a depth frame.

In a second aspect of the disclosure, there is provided a method of obtaining a plurality of charge samples using a continuous wave ToF, CW-ToF, camera system comprising a laser and an imaging sensor having a plurality of imaging pixels for accumulating charge based on incident light, the method comprising: acquiring a first set of charge samples from the imaging sensor by: a) driving the laser to output laser light modulated with a first modulation signal, wherein the first modulation signal has a first frequency; and b) reading out image sensor values indicative of charge accumulated by at least some of the plurality of imaging pixels of the image sensor; acquiring a second set of charge samples from the imaging sensor by: c) driving the laser to output laser light modulated with a second modulation signal, wherein the second modulation signal has a second frequency, and wherein the second frequency is greater than the first frequency; and d) reading out image sensor values indicative of charge accumulated by at least some of the plurality of imaging pixels of from the image sensor, wherein the CW-ToF camera system is operated in a relatively low power mode for acquiring the first set of charge samples compared with the acquiring of the second set of charge samples.

The method may further comprise determining a depth image based on the first set of charge samples and the second set of charge samples.

In a third aspect of the disclosure, there is provided an image acquisition system for use in a continuous wave time of flight, CW-ToF, camera system, the image acquisition system being configured to: obtain a first plurality of charge samples by: driving a laser to emit first laser light modulated with a first modulation signal; and reading out image sensor values from a first plurality of imaging pixels of an imaging sensor; obtain a second plurality of charge samples by: driving the laser to emit second laser light modulated with a second modulation signal; and reading out image sensor values from a second plurality of imaging pixels of the imaging sensor, wherein each of the first plurality of charge samples comprises fewer data points than each of the second plurality of charge samples.

The first plurality of imaging pixels may be fewer in number than the second plurality of imaging pixels.

Obtaining the first plurality of charge samples may further comprise binning the image sensor values of groups of two or more imaging pixels such that each of the first plurality of charge samples comprises a plurality of binned pixel values, wherein the plurality of binned pixel values in each of the first set of charge samples is fewer in number than the plurality of image sensor values in each of the second set of charge samples.

The image acquisition system may be further configured to obtain the first plurality of charge samples by: driving the laser to emit first laser light modulated with the first modulation signal for a plurality of periods of time; for each of the plurality of periods of time, control the imaging sensor to accumulate charge on at least some of the imaging pixels for a portion of the modulation signal, wherein the portion of the modulation signal for which accumulation takes place has a different phase offset for each of the plurality of periods of time; and at the conclusion of each of the plurality of periods of time, obtaining one of the first plurality of charge samples by reading out image sensor values from the first plurality of imaging pixels. The same set of imaging pixels of the imaging sensor may be read out for each of the first plurality of charge samples.

The image acquisition system may be further configured to obtain the first plurality of charge samples by: driving the laser to emit first laser light modulated with the first modulation signal for a period of time; controlling, during the period of time, the imaging sensor to accumulate charge on a first set of imaging pixels for a first portion of the modulation signal; controlling, during the period of time, the imaging sensor to accumulate charge on a second set of imaging pixels for a second portion of the modulation signal, wherein the second portion is the same duration of the modulation signal as the first portion but with a different phase offset; and at the conclusion of the period of time, reading out the first set of imaging pixels to obtain one of the first plurality of charge samples and reading out the second set of imaging pixels to obtain another of the first plurality of charge sample.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

As described in the background section, CW-ToF camera systems are configured to modulate emitted laser light with a first frequency modulation signal and determine a first phase difference between the emitted light and reflected light, before modulating the emitted laser light with a second frequency modulation signal and determine a further phase difference between the emitted light and reflected light. Phase unwrapping can then be performed using the two determined phase differences and a depth map/depth frame determined. The inventors have realised that the accuracy of the phase difference determined using the higher frequency modulation signal affects the overall accuracy of the depth map/frame more than the phase difference determined using the lower frequency modulation signal. As a result, the inventors have recognised that modifying the system in a way that reduces the accuracy of the phase difference determined using the lower frequency modulation signal should have a relatively modest effect on the overall accuracy, since the higher level of accuracy of the phase difference determined using the higher frequency modulation signal goes a long way to compensate.

As a result, modifications that reduce energy consumption and/or increase processing speed, may have a detrimental effect on phase difference accuracy but may be made in relation to the lower frequency laser signal processing whilst still maintaining acceptable overall accuracy. For example, laser emission power may be reduced when modulating it at the lower frequency and/or processing (such as amplification or conversion) of charge signals accumulated by the imaging sensor as a result of reflected laser light during the lower frequency modulation may be reduced. This improves the overall power efficiency of the system. Additionally or alternatively, less data may be read out from the imaging sensor, or pixel data read out from the imaging sensor may be binned in order to reduce the amount of data for subsequent processing, during the lower frequency operations compared with the higher frequency operations (for example, only a sub-set of pixels may be readout after each period of lower modulation frequency illumination). This may not only reduce power consumption at the imaging sensor and processing components, but potentially also reduce the total amount of time it takes to arrive at a determination of the phase difference between lower modulation frequency emitted and received light. That reduction in time may help to reduce image blur when imaging a moving object and may also help to increase the frame rate of the camera system. Furthermore, interpolation may be performed in order to up-sample the data relating to the lower frequency modulation, which may minimise any reduction in accuracy. Consequently, the inventors have developed a lower energy and/or higher speed CW-ToF camera system that still maintains an acceptable level of accuracy for many applications.

Figure 1:
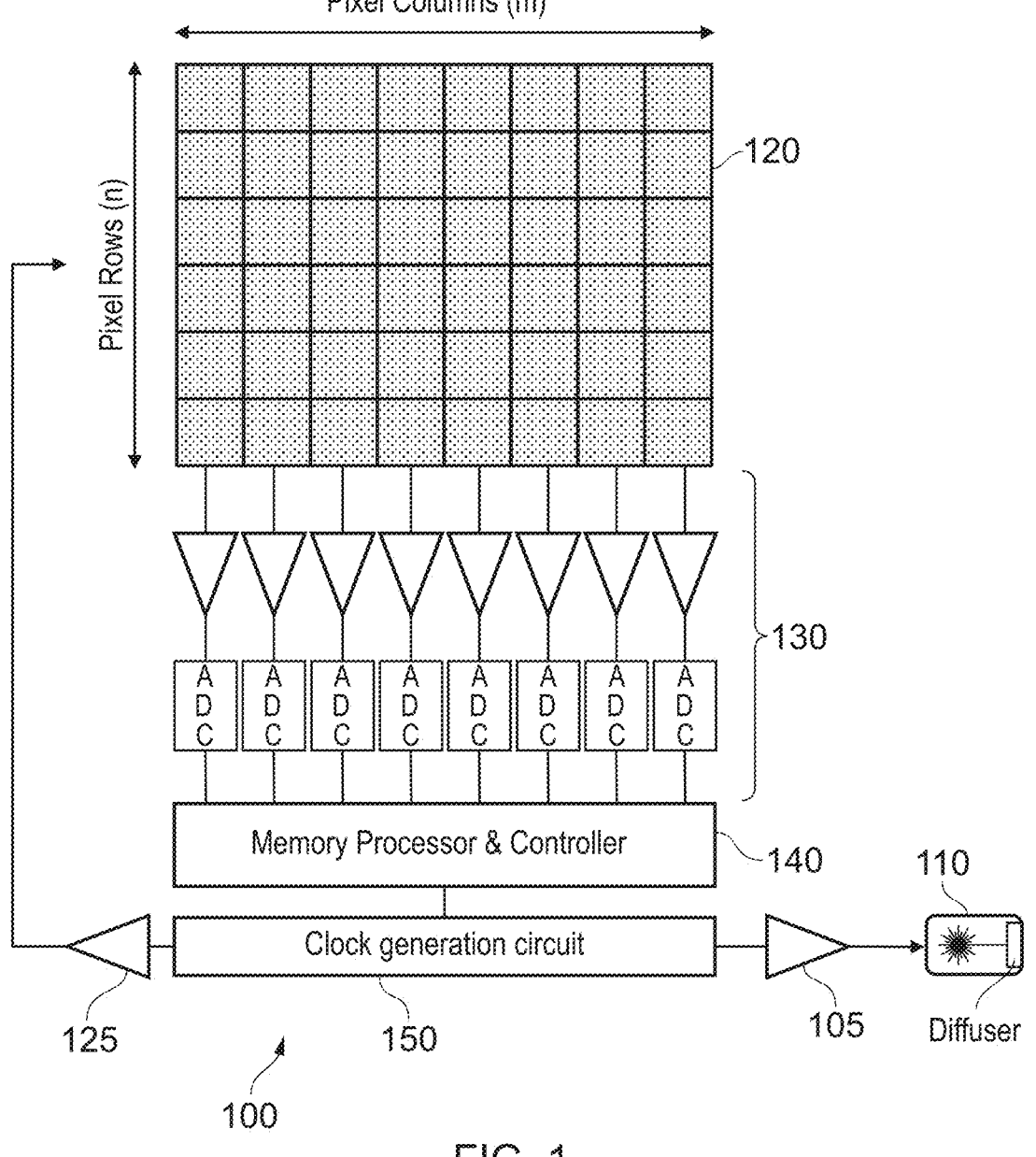
FIG. 1 is a schematic representation of a CW-ToF imaging system in accordance with an aspect of the present disclosure.

FIG. 1 shows an example representation of a CW ToF camera system 100. The system 100 comprises a laser 110 (which may be any suitable type of laser, for example a VCSEL) and a laser driver 105 configured to drive the laser 110 into light emission.

The system 100 also comprises an imaging sensor 120 that comprises a plurality (in this case m×n) of imaging pixels. A converter system 130 (comprising a plurality of amplifiers and ADCs) is coupled to the imaging sensor 120 for reading off image sensor values (for example, voltages) that are indicative of charge accumulated on the imaging pixels, and digitally converting the read off values, which are output to the memory processor & controller 140. The memory processor & controller 140 may be configured to determine depth frames (also referred to as depth maps), indicative of distance to the object being imaged, based on the received digital values indicative of charge accumulated on the imaging pixels. The memory processor & controller 140 may also be configured to determine active brightness frames (also referred to as 2D IR frames/images). Alternatively, the memory processor & controller 140 may be coupled to a processor via a data base (not shown in the figure) and output the acquired digital values for use by the processor in determining depth frames and/or 2D IR frames. The memory processor & controller 140 controls a clock generation circuit 150, which outputs timing signals for driving the laser 110 and for reading charge off the imaging sensor 120. The converter system 130, memory processor & controller 140 and clock generation circuit 150 may together be referred to as an image acquisition system, configured to determine one or more depth frames by controlling the laser 110 emission, controlling the image sensor 120 charge accumulation timing, reading off the image sensor 120 and processing the resultant data.

Figure 2:
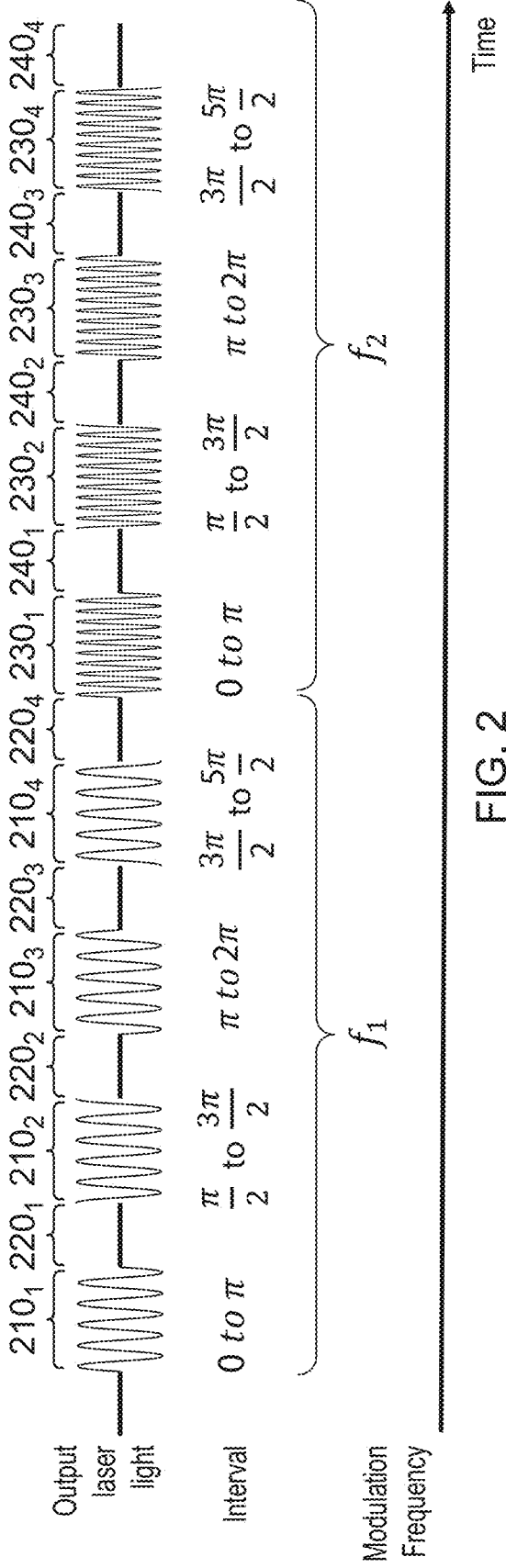
FIG. 2 is a schematic representation of how the CW-ToF imaging system of FIG. 1 may be operated to accumulate and readout charge from the imaging sensor.

FIG. 2 shows an example schematic diagram to help explain the operation of the system 100. The memory processor & controller 140 and clock generation circuit 150 control the laser 110 to output first laser light modulated by a first modulation signal having a first frequency $f_1$ for an accumulation period of time 210₁. During this period of time, some of the first laser light reflected from the object will be incident on the imaging sensor 120. During the accumulation period of time 210₁, the memory processor & controller 140 and clock generation circuit 150 also controls the imaging sensor 120 to accumulate charge based on the incident reflected first laser light for the first part/interval of the period/cycle of the first laser light (0° to 180°, or 0 to ir). For example, the imaging sensor 120 is controlled to "open its shutter" for charge accumulation at the times when the phase of the emitted first laser light is between 0° to 180°. This is so that the phase of the received first laser light relative to the emitted first laser light at a first interval of 0 to ir may later be determined using the charge accumulated on the imaging sensor 120, for example by cross correlating the accumulated charge signal with the first modulation signal. In this example, accumulation takes place for half of the period/cycle of the first laser light, but may alternatively take place for any other suitable amount of time, for example for one quarter of the phase of the first laser light. The skilled person will readily understand how to control the accumulation timing of the imaging sensor 120 using control signals based on the timing of the laser modulation signal. As will be understood by the skilled person, if the image sensor 120 is a single ended pixel type, the pixels may be controlled to accumulate charge for this part/interval of the period and not accumulate any charge for the remainder of the period. If the image sensor 120 is a differential pixel type, the pixels may be controlled to accumulate charge for this part/interval of the period on one side of the pixel and accumulate charge on the other side of the pixel for the remainder of the period. This also applies to the other accumulation parts/intervals described later.

During a subsequent read out period of time 220₁, the memory processor & controller 140 and clock generation circuit 150 control the first laser 110₁ to cease emitting light and control readout image sensor values that are indicative of the charge accumulated in the imaging pixels of the imaging sensor 120. The nature of the readout values will depend on the technology of the imaging sensor 120. For example, if the imaging sensor is a CMOS sensor, voltage values may be readout, where each voltage value is dependent on the charge accumulated in an imaging pixel of the imaging sensor 120, such that the readout values are each indicative of charge accumulated in imaging pixels of the imaging sensor 120. In other sensor technologies, the nature of the readout values may be different, for example charge may be directly readout, or current, etc. For example, the imaging sensor 120 may be controlled to readout image sensor values from row-by-row using any standard readout process and circuitry well understood by the skilled person. In this way, a sample of charge accumulated by each imaging pixel during the period 210₁ may be read off the imaging sensor 120, converted to a digital value and then stored by the memory processor & controller 140. The group of values, or data points, arrived at the conclusion of this process is referred to in this disclosure as a charge sample.

It will be appreciated that the accumulation period of time 210₁ may last for multiple periods/cycles of the first modulation signal (as can be seen in FIG. 1) in order to accumulate sufficient reflected light to perform an accurate determination of the phase of the received reflected light relative to the first modulation signal, for the interval 0 to ir of the first modulation signal.

During accumulation period of time 210₂, the memory processor & controller 140 and clock generation circuit 150 again control the first laser 110₁ to output first laser light modulated by the first modulation signal for an accumution period of time 210₂. This is very similar to the accumulation period 210₁, except during accumulation period of time 210₂ the memory processor & controller 140 and clock generation circuit 150 controls the imaging sensor 120 to accumulate charge for the second part/interval of the period/cycle of the first modulation signal (90° to 270°, or ir/2 to 3ir/2). The read out period 220₂ is very similar to period 220₁, except the obtained charge sample relates to a shifted or delayed interval of ir/2 to 3ir/2 of the first modulation signal.

Accumulation period of time 210₃ is very similar to the period 210₂, except the memory processor & controller 140 and clock generation circuit 150 controls the imaging sensor 120 to accumulate charge for the third part/interval of the period/cycle of the first modulation signal (180° to 360°, or ir to 2ir). The read out period 220₃ is very similar to period 220₂, except the sampled charge data relates to a shifted or delayed interval of ir to 2ir of the first modulation signal.

Finally, accumulation period of time 210₄ is very similar to the period 210₃, except the memory processor & controller 140 and clock generation circuit 150 also controls the imaging sensor 120 to accumulate charge based on the incident reflected first laser light for a fourth part/interval of the period/cycle of the first modulation signal (270° to 90°, or 3/2 to /2). The read out period 220₄ is very similar to period 220₃, except the charge sample relates to a shifted or delayed interval of 3/2 to /2 (or, put another, a shifted or delayed interval of 3/2 to 5/2).

It can be seen from the above that for each accumulation period 210₁-210₄, the start timing of pixel accumulation timing relative to the laser modulation signal is shifted (i.e., the relative phase of the laser modulation signal and the pixel demodulation signal, which controls pixel accumulation timing, is shifted). This may be achieved either by adjusting the pixel demodulation signal or by adjusting the laser modulation signal. For example, the timing of the two signals may be set by a clock and for each of the accumulation periods 210₁-210₄, either the laser modulation signal or the pixel demodulation signal may be incrementally delayed by /2.

Whilst in this example each accumulation period 210₁-210₄ lasts for 50% of the period of the laser modulation signal (i.e., for 180°), in an alternative each accumulation period may be shorter, for example 60°, or 90°, or 120°, etc, with the start of each accumulation period relatively offset by 90° as explained above.

After completing this, four samples of data (charge samples) have been acquired and stored in memory. They together may be referred to as a first set of charge samples. Immediately after the read out period 220₄, or at some later time, a phase relationship between the first laser light and the received reflected light may be determined using the four charge samples (for example by performing a discrete Fourier transform (DFT) on the samples to find the real and imaginary parts of the fundamental frequency, and then determining the phase from the real and imaginary parts, as will be well understood by the skilled person). This may be performed by the image acquisition system, or the charge samples may be output from the image acquisition system to an external processor via a data bus for the determination of the phase relationship. Optionally, active brightness (2D IR) may also be determined (either by the image acquisition system or the external processor) for the reflected first laser light using the four samples (for example, by determining the magnitude of the fundamental frequency from the real and imaginary parts, as will be well understood by the skilled person).

Whilst in this example four samples of data are obtained by having four accumulation periods $210_1$-$210_4$, for some types of imaging pixel the same number of samples may be obtained from fewer accumulation periods. For example, if the imaging pixels are differential pixels, or two tap pixels, one half of each pixel may be readout for the sample relating to accumulation interval 0° to 180°, and the other half may be readout for accumulation interval 180° to 360°. Therefore, two samples may be obtained from a single accumulation period $210_1$ and readout $220_1$. Likewise, two samples for 90° to 270° and 270° to 450° may be obtained from a single accumulation period $210_2$ and readout $220_2$. In a further example, if four tap imaging pixels are used with the start of accumulation on each relatively offset by 90°, all four samples may be obtained from a single accumulation period and readout. However, even when two or more samples may be obtained for two or more different phase off-sets in a single accumulation period and readout, optionally multiple accumulation periods and readouts may still be performed, with each phase offset being moved around the available accumulation region of each imaging pixel for each successive accumulation periods, in order to correct for pixel imperfections. For example, for a four tap imaging pixel, there may be four accumulation periods and readouts with the phase offsets being successively moved around the four accumulation regions of each pixel, resulting in four samples for each phase offset, each sample being readout from a different accumulation region of the pixel, meaning that pixel imperfections can be corrected using the samples.

The skilled person will readily understand that using DFT to determine the phase relationship between the first laser light and the received reflected laser light, and to determine active brightness, is merely one example and that any other suitable alternative technique may be used. By way of brief explanation a further non-limiting example is now described.

The transmitted, modulated laser signal may be described by the following equation:

$$s(t) = A_s\sin(2\pi ft) + B_s$$

Where:
s(t)=optical power of emitted signal
f=laser modulation frequency
$A_s$=amplitude of the modulated emitted signal
$B_s$=offset of the modulated emitted signal
The signal received at the imaging sensor may be described by the following equation:

$$r(t) = a(A_s\sin(2\pi ft + \Phi)) + B_s) + Benv$$

$$\Phi) = 2\pi fA$$

$$A = \frac{2d}{c}$$

Where:
r(t)=optical power of received signal
α=attenuation factor of the received signal
Φ)=phase shift
$B_{env}$=amplitude of background light A=time delay between emitted and received signals (i.e., time of flight)
d=distance to imaged object
c=speed of light
Accumulation timing of the imaging pixels may be controlled using a demodulation signal, g(t−T), which is effectively a time delayed version of the illumination signal.

$$g(t - T) = A_g\sin(2\pi rf(t - T)) + B_g$$

Where:
T=a variable delay, which can be set to achieve the phase delays/offsets between each accumulation period $210_1$-$210_4$ described above
$A_g$=amplitude of the demodulation signal
$B_g$=offset of the demodulation signal
The imaging pixels of the imaging sensor effectively multiply the signals r(t) and g(t−T). The resulting signal may be integrated by the imaging pixels of the imaging sensor to yield a cross correlation signal c(T):

$$c(T) = A\sin(2\pi rf(t- T)) + B$$

By driving the imaging sensor to accumulate at different offsets during different accumulation periods, as described above, it is possible to measure correlation at different time offsets T (phase-offsets v) 0, 7r/2, 7r, 37r/2:

$$c(T) = A\sin(2\pi rf(t- T)) + B = A\sin(0 - v) + B$$

$$c(T) = A(\sin(0)\cos(-v) + \cos(0)\sin(-v)) + B$$

$$c(0) = Al = A(\sin(0)) + B$$

$$c(^{7r}2) = A2 = -A(\cos(C) + B$$

$$c(7r) = A3 = -A(\sin(0)) + B$$

$$c(37r2) = A4 = A(\cos(C) + B$$

From these readings, it can be determined that the phase offset/time of flight can be found by:

$$0 = 2\pi rfA = \arctan(\sin(0)\cos(0)) = a\tan(Al - A3$$

Therefore, a depth image or map can be determined using the four charge samples acquired from the image sensor.

An active brightness, or 2D IR, image/frame may also be determined by determining. $1(A4-A2)2+(Al-A3)2$.

Subsequently, the process described earlier in relation to periods $210_1$-$210_4$ and $220_1$-$220_4$ may then be repeated in accumulation periods $230_1$-$230_4$ and read out periods $240_1$-$240_4$. These are the same as the accumulation periods $210_1$-$210_4$ and read out periods $220_1$-$220_4$, except rather than driving the laser $110_1$ to emit light modulated with the first modulation signal, the laser 110 is driven to emit light modulated with a second modulation signal. The second modulation signal has a second frequency $f_2$, which is higher than the first (A4−A2) frequency $f_1$. As a result, four further samples of data (charge samples) are obtained and stored in memory. Based on these charge samples, a phase relationship between the second laser light and the received reflected light (and optionally also the active brightness for the reflected second laser light) may be determined either by the image acquisition system or the external processor, for example using DFT or correlation function processes as described above.

Using the determined phase relationship between the first laser light and the received reflected light and the determined phase relationship between the second laser light and the received reflected light, phase unwrapping may be performed and a single depth image/frame determined by the memory processor & controller 140 (as will be understood by the skilled person). In this way, any phase wrapping issues can be resolved so that an accurate depth frame can be determined. This process may be repeated many times in order to generate a time series of depth frames, which may together form a video.

Optionally, a 2D IR frame may also be determined using the determined active brightness for the first laser light and/or the determined active brightness for the second laser light.

The inventors have recognised that the above described process for acquiring a first set of charge samples (which includes accumulation periods $210_1$-$210_4$ and read out periods $220_1$-$220_4$) and acquiring a second set of charge samples (which includes accumulation periods $230_1$-$230_4$ and read out periods $240_1$-$240_4$) takes a relatively large amount of time. For example, each accumulation period may last in the region of about 100 μs and each read out period may last in the region of about 3 ms, such that the entire process lasts in the region of 19 ms. During this time, the object being imaged may move relative to the camera system 100, such that the finally determined depth frame may have a blurred image of the object and/or have some inaccuracies. Furthermore, they have recognised the above described processes may require fairly significant energy consumption, which may be particularly significant if the system 100 is implemented within a battery operated device, such as a smartphone or tablet.

The inventors have identified that the first set of charge samples may contribute to the final accuracy of the depth frame less than the second set of charge samples. This is because the first set of charge samples are acquired using laser light modulated with a lower frequency modulation signal (and therefore longer wavelength) than the second set of charge samples. As a result, the samples of the correlation between the first modulation signal and the received reflected light (which are determined using the first set of charge samples) effectively provide a relatively coarse indication of distance to the object. The samples of the correlation between the second modulation signal and the received reflected light (which are determined using the second set of charge samples) effectively refine that relatively coarse indication of distance to the object to provide greater depth accuracy. The inventors have recognised that the accuracy of the samples of the correlation between the first modulation signal and the received reflected light may therefore be reduced without any significant reduction in the quality or accuracy of the determined depth frame. Therefore, the inventors have developed various different ways in which the image acquisition system of the camera system 100 may be operated in a relatively lower energy mode during the acquisition of the first set of charge samples and a relatively higher energy mode during acquisition of the second set of charge samples. By operating in a lower energy mode for acquisition of the first set of charge samples, not only is overall energy consumption reduced, but also the overall time for acquiring the first and second sets of charge samples may be reduced (depending on which of the lower power techniques described below are used). Reducing the overall time may not only help to reduce motion blur within a frame when imaging a moving object, it may also help to achieve a higher frame rate for the camera, since each frame requires less time to determine.

The image acquisition system may be configured to implement any one or more of the lower power techniques described below:

A) Lower Optical Power Laser Light

The image acquisition system may be configured to drive the laser 110 to emit lower optical power light during accumulation periods $210_1$-$210_4$ compared with accumulation periods $230_1$-$230_4$. This may be done, for example, by controlling the driver 105 to drive the laser 110 with a lower driving current during accumulation periods $210_1$-$210_4$ compared with accumulation periods $230_1$-$230_4$.

Outputting lower optical power may result in less reflected light being incident on the imaging sensor 120, such that the first set of charge samples provides a lower accuracy of phase information than the second set of charge samples. However, as explained above, this may not significantly affect the accuracy of the depth image, such that the determined depth image still has acceptable accuracy.

B) Shorter Accumulation Periods

The image acquisition system may be configured to drive the laser 110 for a shorter amount of time when acquiring the first set of charge samples compared with acquiring the second set of charge samples. In particular, each of the accumulation periods $210_1$-$210_4$ may be shorter than each of the accumulation periods $230_1$-$230_4$. Not only should this reduce energy consumption, it should also reduce the overall time required for acquiring the charge samples, thereby reducing motion blur/motion artefacts in the depth frame.

Outputting laser light for shorter periods of time may result in less reflected light being accumulated on the imaging sensor during the accumulation periods $210_1$-$210_4$, such that the first set of charge samples provides a lower accuracy of phase information than the second set of charge samples. However, as explained above, this may not significantly affect the accuracy of the depth image, such that the determined depth image still has acceptable accuracy.

C) Fewer Charge Samples in the First Set of Charge Samples

The image acquisition system may be configured to acquire fewer charge samples when the laser light is modulated using the first modulation signal compared with the number of charge samples acquired when the laser light is modulated using the second modulation signal. For example, the number of accumulation periods $210_1$-$210_4$, and the corresponding number of read out periods $220_1$-$220_4$, may be reduced such that the first set of charge samples is smaller in number than the second set of charge samples. This should result in a significant reduction in energy consumption, since the laser 110 is being driven for fewer accumulation periods, and the image acquisition system is consuming readout energy (such as power for the amplifiers and ADCs 130s) for fewer readout periods. Furthermore, it should result in a significant reduction in the overall time required for acquiring the charge samples, since each read out period may typically take about 3 ms, thereby reducing motion blur/motion artefacts in the depth frame. Furthermore, it should reduce memory requirements on the memory processor & controller 140 since fewer charge samples will need to be stored, thereby reducing size and cost.

Acquiring fewer charge samples in the first set of charge samples may result in a reduction in the accuracy of the phase information that can be determined using the first set of charge samples. However, as explained above, this may not significantly affect the accuracy of the depth image, such that the determined depth image still has acceptable accuracy.

D) Lower Power Amplifier and/or ADC Operation

The image acquisition system may be configured to operate at least some of the amplifiers and/or the ADCs 130 in a lower power mode of operation for read out periods $220_1$-$220_4$ compared with read out periods $240_1$-$240_4$. For example, the amplifiers may be operated in a mode to amplify signals by a lesser amount during read out periods $220_1$-$220_4$ compared with the level of amplification during the read out periods $240_1$-$240_4$ and/or they may be run in a mode of operation that consumes less power but has a reduced accuracy of amplification/higher noise/lower bandwidth. Additionally, or alternatively, the ADCs may, for example, be allowed less time to settle when performing conversions during the read out periods $220_1$-$220_4$ compared with during the read out periods $240_1$-$240_4$.

Operating the amplifiers and/or ADCs 130 in this way may reduce the accuracy of the phase information that can be determined using the first set of charge samples. However, as explained above, this may not significantly affect the accuracy of the depth image, such that the determined depth image still has acceptable accuracy.

E) Reading Fewer Imaging Pixels

The image acquisition system may be configured to read out image sensor values from fewer imaging pixels of the imaging sensor 120 during read out periods $220_1$-$220_4$ compared with the number of pixels read out during periods $240_1$-$240_4$. In this example, each charge sample may comprise all of the image sensor values readout from the imaging sensor 120 during a readout period $220_1$-$2204$, $240_1$-$2404$. As a result, each of the charge samples obtained in relation to the first frequency $f_1$ (for example, each of the charge samples obtained by read out periods $220_1$-$220_4$) will have less data/fewer data points, i.e., will comprise data from fewer imaging pixels, than each of the samples obtained in relation to frequency $f_2$ (for example, each of the charge samples obtained by read out periods $240_1$-$240_4$).

Figure 3:
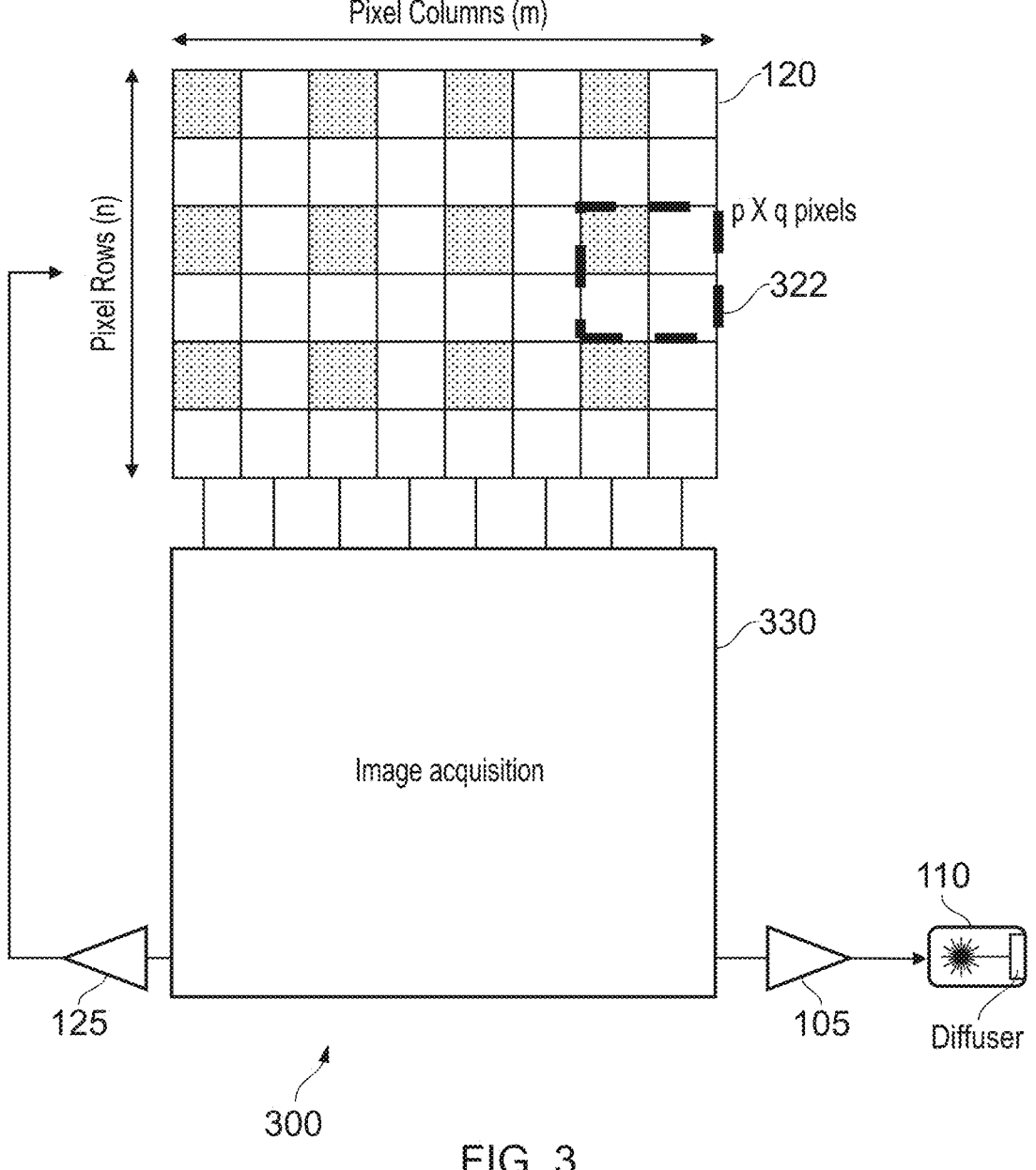
FIG. 3 is a schematic representation of a CW-ToF imaging system in accordance with a further aspect of the present disclosure.

FIG. 3 shows one example camera system 300 comprising an image acquisition system 330 configured to read out image sensor values from fewer imaging pixels during read out periods $220_1$-$220_4$ compared with the image sensor values readout from the imaging pixels during periods $240_1$-$240_4$ (i.e., sub-sampling the imaging sensor 120 during the periods $220_1$-$220_4$). During each of the periods $220_1$-$220_4$, image sensor values from a first set of imaging pixels are read out and during each of the periods $240_1$-$240_4$, image sensor values from a second set of imaging pixels are read out. This can be seen in FIG. 3, where values from only the highlighted imaging pixels are read off during the periods $220_1$-$220_4$, whereas during the periods $240_1$-$240_4$ values are read off from all of the imaging pixels. In this example, an image sensor value is readout from only one imaging pixel per pxq pixels 322 during the periods $220_1$-$220_4$. Since in this example p=2 and q=2, this means only one in four imaging pixels are read out during the periods $220_1$-$220_4$. However, it will be appreciated that the imaging acquisition system 330 may be configured to sub-sample in any other suitable ratio, for example reading out one in two imaging pixels, or one in three imaging pixels, etc. The skilled person will readily understand how to address the imaging sensor 120 in order to read out some, but not all, of the imaging pixels in the sensor.

By sub-sampling the imaging pixels in this way, read-out time may be significantly reduced. Furthermore, energy consumption may also be significantly reduced, since fewer signals needs to be amplified and converted. Furthermore, the memory requirements on the image acquisition system 330 may be reduced, thereby reducing size and cost.

The image acquisition system 330 may be configured to control the imaging sensor 120 to accumulate charge on all of the imaging pixels for each of periods $210_1$-$210_4$ and then readout only a subset of those imaging pixels, or may be configured to control the imaging sensor 120 to accumulate charge on only some of the imaging pixels for each of periods $210_1$-$210_4$ and then readout those imaging pixels.

Figure 4:
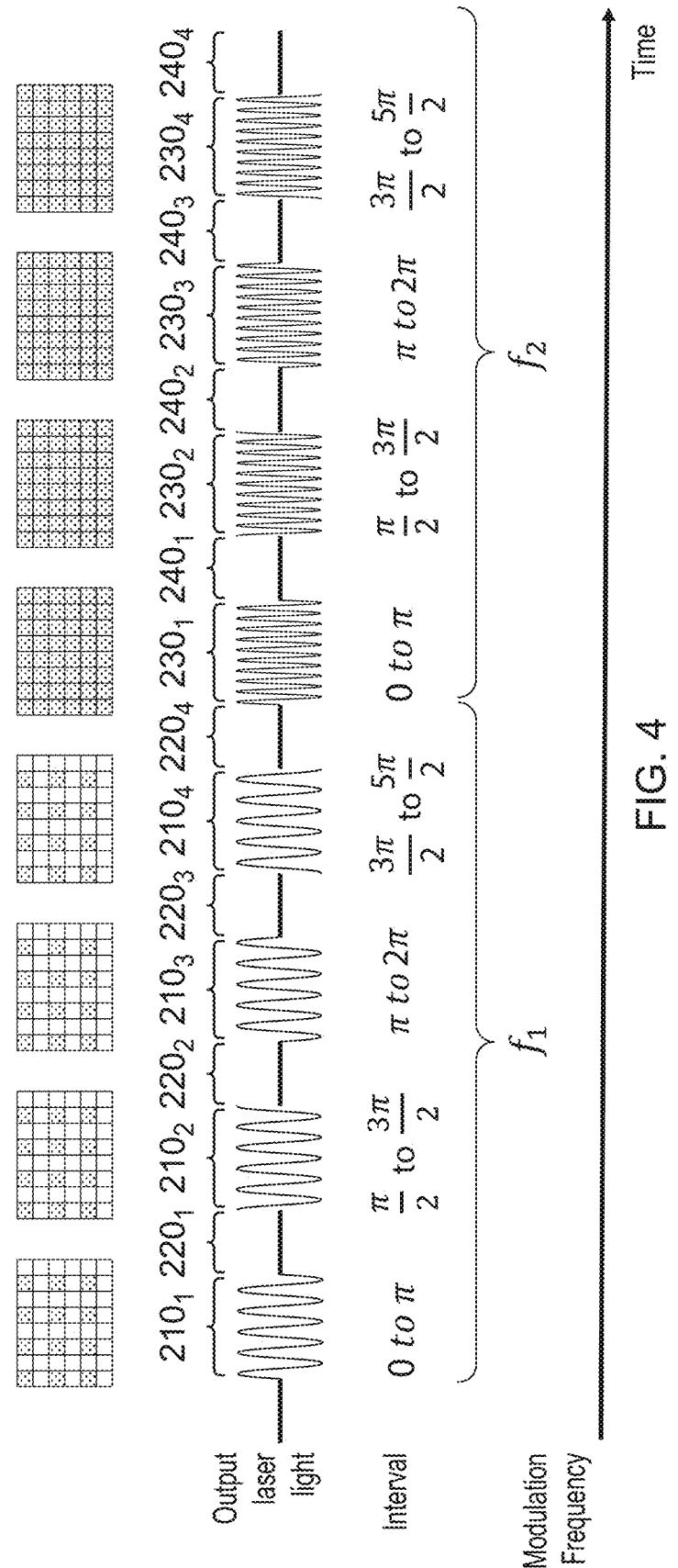
FIG. 4 is a schematic representation of how the CW-ToF imaging system of FIG. 3 may be operated to accumulate and readout charge from the imaging sensor.

FIG. 4 shows an example where the image acquisition system 330 is configured to control the imaging sensor 120 to accumulate charge on only some of the imaging pixels, in this case the same imaging pixels for each of periods $210_1$-$210_4$ (i.e. control the imaging sensor 120 to "open the shutter" on the same sub-set of imaging pixels during each of $210_1$-$210_4$). In this case, each of the charge samples read out during the periods $220_1$-$220_4$ would be indicative of charges accumulated by the same sub-set of imaging pixels. However, in an alternative, the image acquisition system 330 may be configured to control the imaging sensor 120 to accumulate charge on a different sub-set of imaging pixels for at least some of the periods $210_1$-$210_4$ (i.e. control the imaging sensor 120 to "open the shutter" on a different subset of pixels during at least some of the periods $210_1$-$210_4$)

Figure 5:
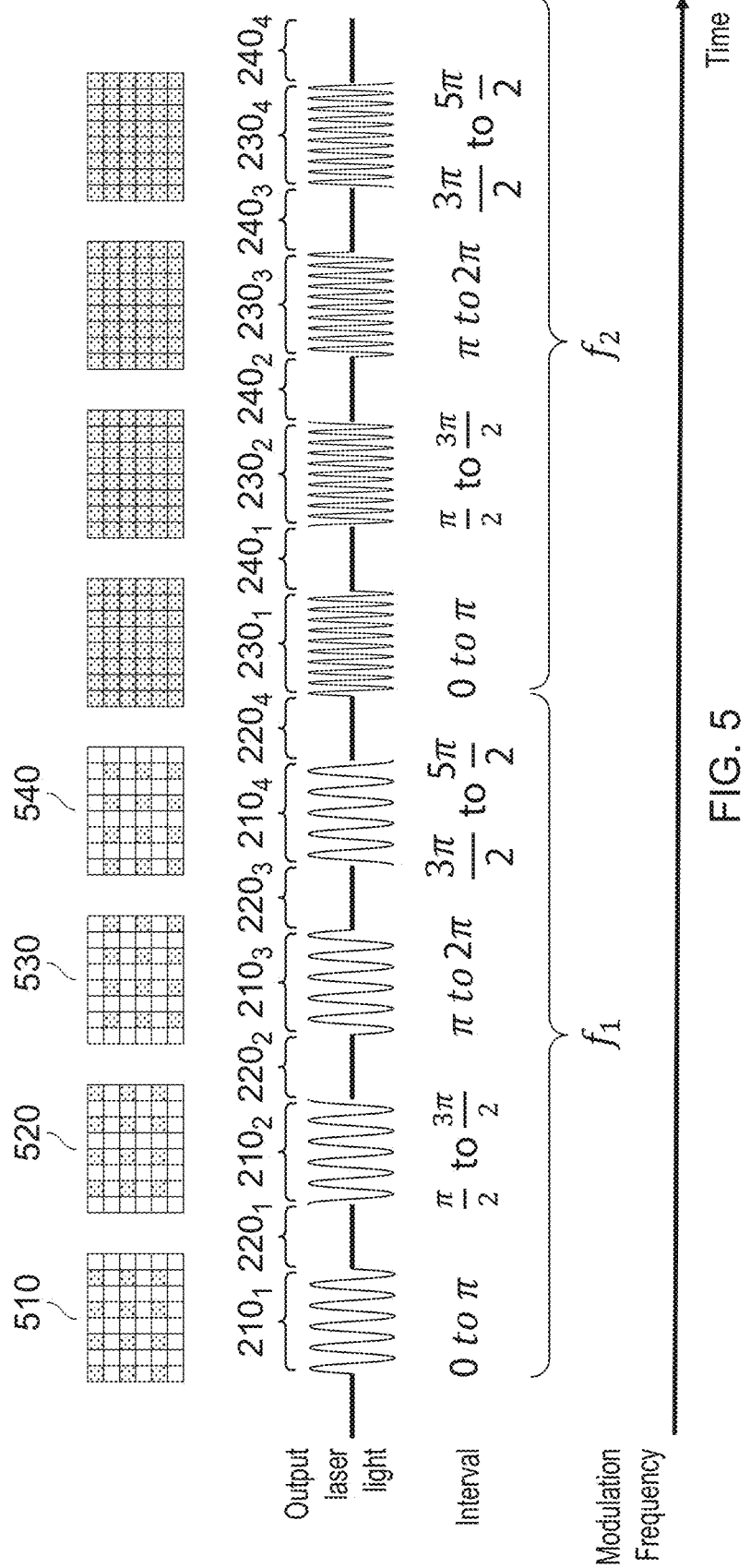
FIG. 5 is a schematic representation of an alternative way in which the CW-ToF imaging system of FIG. 3 may be operated to accumulate and readout charge from the imaging sensor.

FIG. 5 shows an example representation of such a process. In each of the illustrations 510, 520, 530, 540, the highlighted imaging pixels are the pixels that are controlled to accumulate charge for that particular accumulation period. For example, the highlighted imaging pixels in 510 are controlled to accumulate charge during period $210_1$, such that the image sensor values read out during period $220_1$ include charge information from those highlighted imaging pixels. The highlighted imaging pixels in 520 are controlled to accumulate charge during period $210_2$, such that the values read out during period $220_2$ include charge information from those highlighted imaging pixels, etc. Consequently, in this example each of the charge samples obtained during periods $220_1$-$220_4$ may comprise charge information from a different sub-set of imaging pixels. Up-sampling is explained in more detail later, but it should be noted that optionally each of the charge samples read out during periods $220_1$-$220_4$ may be up-sampled before they are processed further. Alternatively, up-sampling may take place on the results of the determination of the phase of the received reflected light relative to the first modulation signal.

Figure 6:
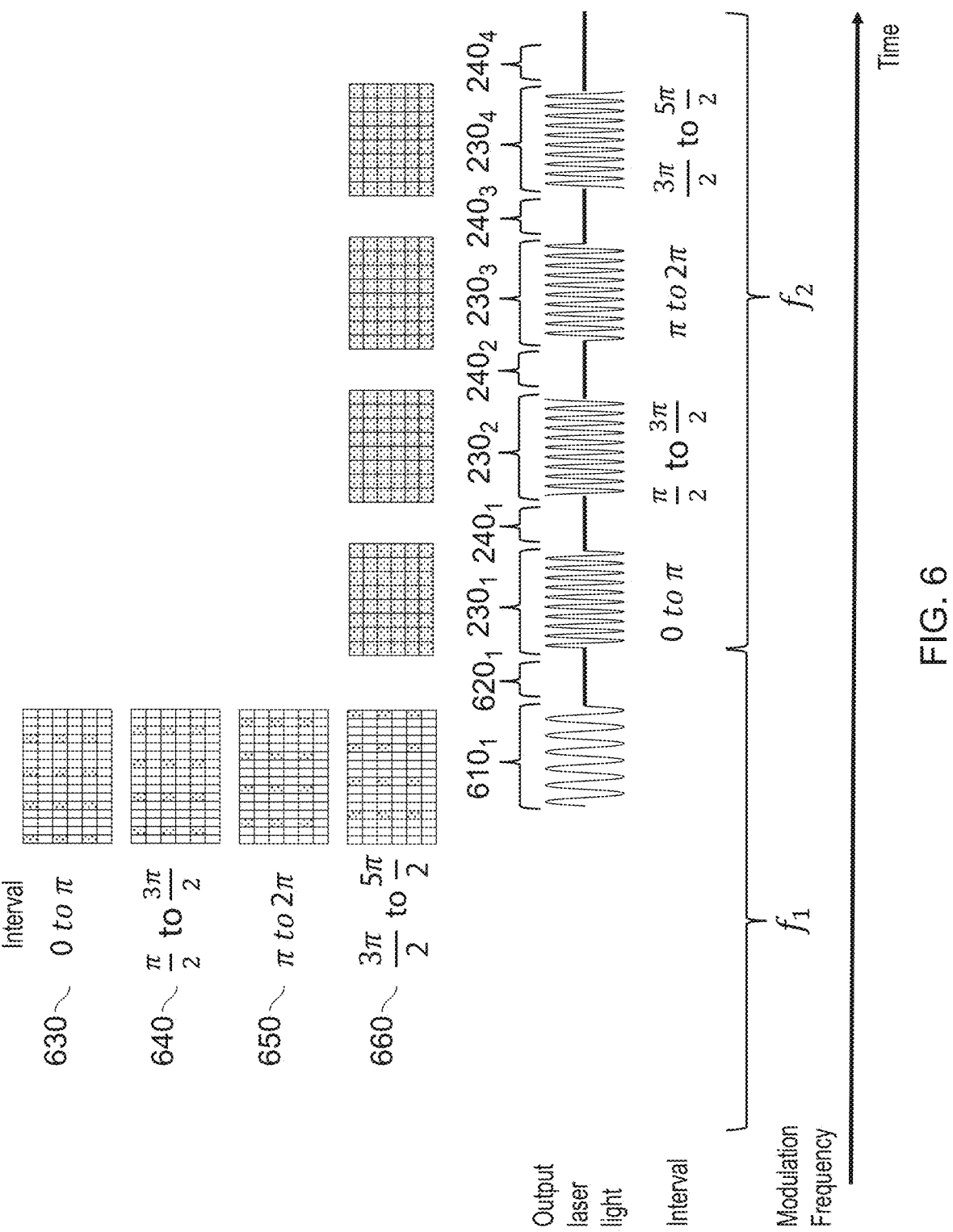
FIG. 6 is a schematic representation of a further alternative way in which the CW-ToF imaging system of FIG. 3 may be operated to accumulate and readout charge from the imaging sensor.

FIG. 6 shows an example representation of a further process whereby the image acquisition system 330 is configured to control the imaging sensor 120 to accumulate charge on a different sub-set of imaging pixels for at least some of the phase intervals. In this example, there is a single accumulation period $610_1$ and a single readout period $620_1$. However, the image acquisition system 330 is configured to control the imaging sensor 120 to accumulate charge (i.e., open the shutter) on some imaging pixels during the interval 0 to n of the first modulation signal. Those imaging pixels are highlighted in illustration 630. The image acquisition system 330 is configured to control the imaging sensor 120 to accumulate charge on a different sub-set of imaging pixels during the interval $\pi/2$ to $\pi/2$ of the first modulation signal. Those imaging pixels are highlighted in illustration 640. The image acquisition system 330 is configured to control the imaging sensor 120 to accumulate charge on a different sub-set of imaging pixels during the interval $\pi$ to 0 of the first modulation signal. Those imaging pixels are highlighted in illustration 650. The image acquisition system 330 is configured to control the imaging sensor 120 to accumulate charge on a different sub-set of imaging pixels during the interval $3\pi/2$ to $\pi/2$ of the first modulation signal. Those imaging pixels are highlighted in illustration 660. In this particular example, it can be seen that the image acquisition system 330 is configured to open a first sub-set of columns of the imaging sensor 120 for accumulation during the interval 0 to $\pi$, open a different sub-set of columns of the imaging sensor 120 for accumulation during the interval $\pi/2$ to $3\pi/2$, open a different sub-set of columns of the imaging sensor 120 for accumulation during the interval $\pi$ to 0, and open a different sub-set of columns of the imaging sensor 120 for accumulation during the interval $\pi/2$ to $3\pi/2$. The skilled person may readily appreciate how to achieve this control, for example by setting an appropriate variable delay timing $\tau$ for each column demodulation signal $g(t-\tau)$. However, it will be appreciated that the image acquisition system 330 may be configured to control the operation of the imaging sensor 120 in any other suitable way to achieve a similar result.

Consequently, it can be seen that according to this process, four different charge samples may be obtained from a single accumulation period $610_1$ and readout period $620_1$, each charge sample relating to a different sub-set of imaging pixels that were controlled to accumulate charge for different offset portions/intervals of the modulation signal (i.e., 0 to $\pi$, $\pi/2$ to $3\pi/2$, etc). Consequently, a significant reduction in time and power consumption is achieved compared with previous examples where multiple accumulation and read-out periods are used for the first modulation frequency $f_1$. Furthermore, as can be seen from FIG. 6, in this example fewer imaging pixels overall are readout for frequency $f_1$ compared with frequency $f_2$ (half the number of pixels, in this example). Thus, an even further reduction in energy consumption and a reduction in memory requirements is achieved. However, it will be appreciated that in some other alternative implementations, the overall total number of imaging pixels that are read out from the imaging sensor 120 during read-out period 620 may be the same as the number of imaging pixels read out in each of periods $240_1$-$240_4$ (for example, each of the charge samples accumulated during period $610_1$ may comprise ¼ of the imaging pixels). Up-sampling is explained in more detail later, but it should be noted that optionally each of the charge samples read out during period $620_1$ may be up-sampled before they are processed further. Alternatively, up-sampling may take place on the results of the determination of the phase of the received reflected light relative to the first modulation signal.

In each of the examples above, sub-sampling of the imaging pixels is evenly spread across the imaging sensor 120. However, in an alternative, in some areas of the imaging sensor 120 more imaging pixels may be sampled than in other areas of the imaging sensor 120. For example, the image acquisition system 330 may be configured to control the imaging sensor 120 to accumulate charge at full (or nearly full) resolution in some parts of the imaging sensor 120 (for example, in regions of interest) and accumulate charge at lower, or sub-sample, resolution in other parts of the imaging sensor 120.

Figure 7:
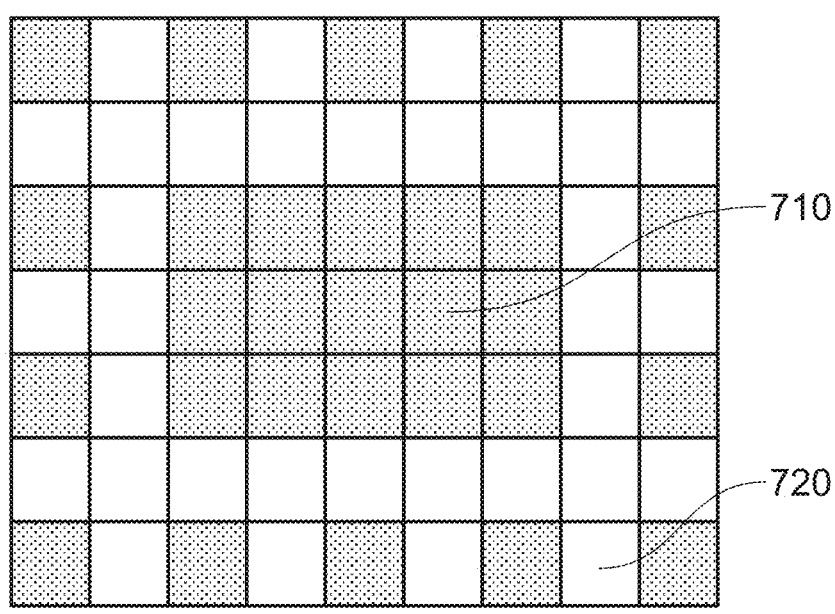
FIG. 7 is a representation of an example type of pixel sub-sampling.

FIG. 7 shows an example representation where the highlighted imaging pixels have been controlled to accumulate charge during periods $210_1$-$210_4$. It can be seen that in a central area 710 of the imaging sensor 120 (a region of interest), all of the imaging pixels are controlled to accumulate charge (i.e, have their shutters open). In a peripheral area 720 of the imaging sensor 120, the imaging pixels are sub-sampled. In this way, a high resolution of imaging in what is likely to be the most important area of the image may be maintained for the first modulation frequency $f_1$, whilst still achieving a reduction in energy consumption. In this example, each of the charge samples that are acquired for the first modulation frequency $f_1$ may include image sensor values from the same imaging pixels. In an alternative, the sub-sampled imaging pixels may be different for at least some of the charge samples, as described with reference to FIGS. 5 and 6.

In each of the examples described above, all of the charge samples that are acquired for the second modulation frequency $f_2$ include image sensor values from all of the imaging pixels of the imaging sensor 120. However, in an alternative, the image acquisition system 330 may be configured to control the imaging sensor 120 in such a way that each of the charge samples for the second modulation frequency $f_2$ include image sensor values for some, but not all, of the imaging pixels of the imaging sensor 120. Provided the number of imaging pixels used for each of the charge samples in respect of the first modulation frequency $f_1$ is fewer than the number of imaging pixels used for each of the charge samples in respect of the second modulation frequency $f_2$, a reduction in energy consumption will still be achieved compared with if the number of imaging pixels used is the same for the first modulation frequency $f_1$ and the second modulation frequency $f_2$.

F) Binning Values From Imaging Pixels

Above is described a process whereby in each of the acquired charge samples, there is a 1:1 relationship between imaging pixels readout and values/data points in the charge sample (i.e., each charge sample includes all of the image sensor values readout from the imaging sensor 120 during a readout period). Since fewer imaging pixels are readout in relation to the first modulation frequency $f_1$ compared with the second modulation frequency $f_2$, the number of values/data points in each charge sample obtained in relation to the first modulation frequency $f_1$ is lower than the number of values/data points in each charge sample obtained in relation to the second modulation frequency $f_2$.

Figure 8:
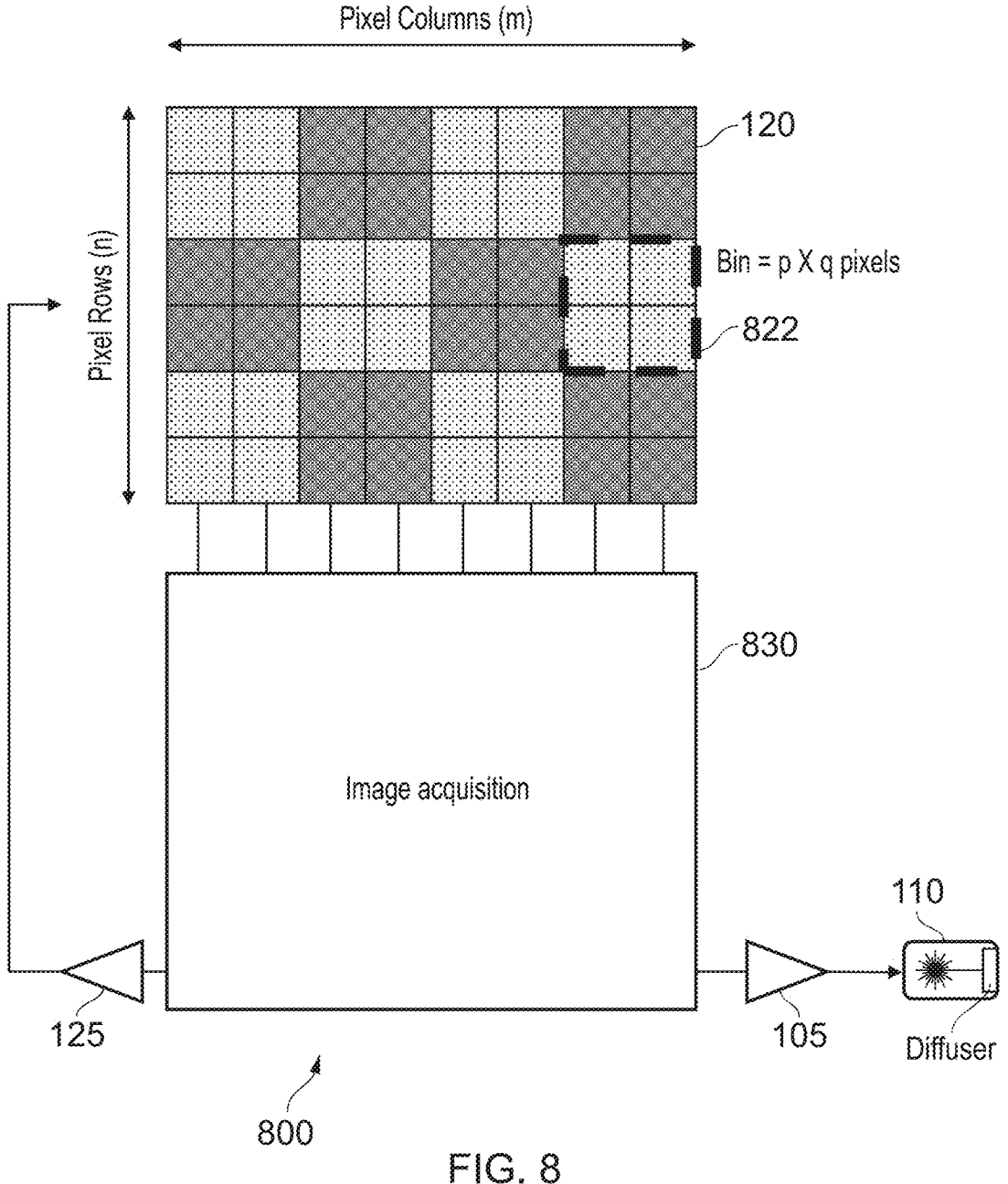
FIG. 8 is a schematic representation of a CW-ToF imaging system in accordance with a further aspect of the present disclosure.

FIG. 8 shows an alternative way in which the same result may be achieved. The camera system 800 is configured to bin image sensor values (i.e., combine values) of groups of two or more imaging pixels when acquiring the first set of charge samples. In this example, four imaging pixels are effectively combined, or binned, into a single binned pixel 822 comprises p×q imaging sensor pixels, where p=2 and q=2. This is repeated across the imaging sensor 120 so that there are a total of (m·n)/(p·q) binned pixel values. Pixel binning may take place in various different ways. For example, it may take place in the charge domain, by virtue of the imaging sensor 120 being configured to be controllable by the image acquisition system 830 to selectively combine charge from a plurality imaging pixels, such that for each binned pixel a single value indicative of accumulated charge may be readout by the image acquisition system 830. In another example, the image acquisition may readout image sensor values from each imaging pixel and then bin groups of two or more image sensor values together in the analog domain or the digital domain in order to create a binned pixel 822. Each binned pixel value may be the sum of the two or more image sensor values that have been binned, or an average of the two or more image sensor values that have been binned.

Each of the first set of charge samples may include a plurality of binned pixel values, one for each binned pixel. As a result, by binning, or combining, imaging pixels the number of values/data points in each of the first set of charge samples will be lower than the number of values/data points in each of the second set of charge samples. In this example, because each binned pixel comprises four imaging pixels, the size of each of the first set of charge samples may be a quarter of the size of each of the second set of charge samples. It should be appreciated that each binned pixel may be made up from any number of imaging pixels, for example two or more imaging pixels.

If the imaging pixels are binned in the charge domain, read-out time and energy may be significantly reduced, since fewer signals need to be readout, amplified, digitally converted and stored. If the imaging pixels are binned in the analog domain, energy may be significantly reduced, since fewer signals need to be amplified, digitally converted and stored. If the imaging pixels are binned in the digital domain, energy may still be reduced, since less data may need to be stored, and also if the image acquisition system 830 outputs the charge samples to an external processor for the determination of a depth frame, less data will be transferred, which should reduce energy consumption.

It will be appreciated that in each of the examples described above with reference to FIGS. 3 to 8, the number of data points in each of the first set of charge samples is less than the number of data points in each of the second set of charge samples (i.e., the data size of each of the first set of charge samples is less than the data size of each of the second set of charge samples), because for the first set of charge samples fewer image sensor values were read off the imaging sensor 120 and/or because of pixel binning. As a result, the resolution of the first set of charge samples may be reduced compared with the second set of charge samples, which may affect the accuracy of the determined depth frame. Optionally, as part of the process of determining the depth frame based on the first set of charge samples and the second set of charge samples, the first set of charge samples may be digitally up sampled so that the resolution is increased (for example, up sampling the data in each of the first set of charge samples so that the number of data points in the charge samples used in the determination of phase difference is the same for the first modulation frequency as the second modulation frequency). Any suitable up sampling technique may be used (for example, interpolation such as linear interpolation, cubic interpolation, vector scaling, etc). The up sampling may take place at any suitable time during the depth frame determination. For example, up sampling may take place prior to the determination of the phase of the received reflected light relative to the first modulation signal (for example, before performing DFT or the correlation function technique described above on the charge samples that are read out in relation to the first laser light). Alternatively, the phase of the received reflected light relative to the first modulation signal may be determined based on the first set of sampled charges, and up sampling then performed on the determined phases prior to the process of phase unwrapping for the final depth frame, so that the number of determined phases in relation to frequency $f_1$ is the same as the number of determined phases in relation to the frequency $f_2$ (i.e., that for each imaging pixel readout during readout periods $240_1$-$240_4$, there are two phases available, one determined using the first set of charge samples and the other determined using the second set of charge samples).

Where up sampling is performed, there should be very little, if any, appreciable reduction in accuracy of the depth frame. Furthermore, because up sampling can take place during the processing that is performed after the accumulation and read out periods represented in FIG. 2, it does not affect the time or energy required to acquire the samples of charge. However, it will be appreciated that up sampling is optional, depending on the level of accuracy required for the depth frame.

Optionally, up sampling may also be performed during a process of determining an active brightness frame based on the magnitude of the values in the first set of charge samples and the second set of charge samples (for example, up sampling the magnitude of the data points, such as image sensor values or binned pixel values, the first set of charge samples).

Figure 9:
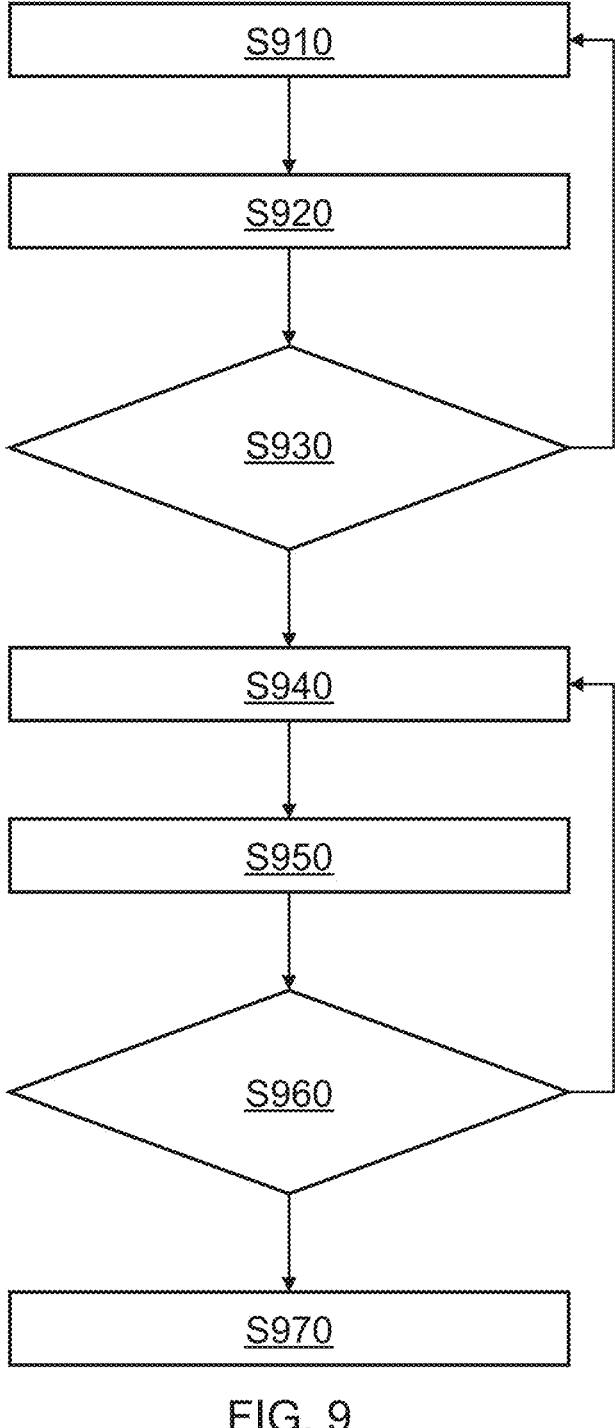
FIG. 9 represents example method steps according to an aspect of the present disclosure.

FIG. 9 represents example method steps according to an aspect of the present disclosure. In Step S910, the image acquisition system drives the laser to output laser light at a first frequency and controls charge accumulation timing of at least some of the imaging pixels of the imaging sensor 120, as described above in the various different examples. In Step S920, image sensor values are readout from the imaging sensor 120, those values being indicative of charge accumulated by at least some of the imaging pixels. In Step S930, it is determined whether all of the required charge samples have been obtained for the first frequency of laser light. If they have not, the process returns to Step S910 so as to repeat Steps S910 and S920, for example at a different phase offset for pixel charge accumulation. In this way, all of the required accumulation periods $210_1$-$210_4$ and readout periods $220_1$-$220_4$ described above may be completed.

When it is determined that all the required charge samples have been obtained for the first frequency of laser light (i.e., the complete first set of charge samples has been acquired), the process proceeds to Step S940 where the image acquisition system drives the laser to output laser light at a second frequency and controls charge accumulation timing of at least some of the imaging pixels of the imaging sensor 120, as described above in the various different examples. In Step S950, image sensor values are readout from the imaging sensor 120, those values being indicative of charge accumulated by at least some of the imaging pixels. In Step S960, it is determined whether all of the required charge samples have been obtained for the second frequency of laser light. If they have not, the process returns to Step S940 so as to repeat Steps S940 and S950, for example at a different phase offset for pixel charge accumulation. In this way, all of the required accumulation periods $230_1$-$230_4$ and readout periods $240_1$-$240_4$ described above may be completed.

When it is determined that all the required charge samples have been obtained for the second frequency of laser light (i.e., the complete second set of charge samples has been acquired), the process proceeds to S970 where the obtained first set of charge samples and second set of charge samples are either output to a processor for the determining of a depth frame, or the image acquisition system itself determines a depth frame.

In one example, the first laser frequency is of a lower frequency than the second laser frequency, in which case Steps S910 and S920 are performed using any one or more of the lower power/higher speed techniques described above. In an alternative, the second laser frequency is of a lower frequency than the first laser frequency, in which case Steps S940 and S950 are performed using any one or more of the lower power/higher speed techniques described above. In other words, the system may be configured to perform the lower laser frequency parts of its operation either before or after the higher laser frequency parts.

Throughout this disclosure, the term "electrically coupled" or "electrically coupling" encompasses both a direct electrical connection between components, or an indirect electrical connection (for example, where the two components are electrically connected via at least one further component).

The skilled person will readily appreciate that various alterations or modifications may be made to the above described aspects of the disclosure without departing from the scope of the disclosure.

The image sensors described above may be a single ended pixel or differential pixel define (for example, a CMOS single ended or differential sensor design). Therefore, it will be appreciated that each pixel readout may either be single ended or differential.

Whilst the above description describes the lower frequency $f_1$ samples being acquired before the high frequency $f_2$ samples, it will be appreciated that the samples may alternatively be acquired in the opposite order.

Each of the different techniques described above for energy reduction/speed improvement may be implemented on their own, or in any combination of two or more. For example, techniques A and E may both be implemented by the image acquisition system to achieve even further enhanced power saving.

Whilst in the above description, four charge samples are always determined in relation to frequency $f_2$, and usually a corresponding four charge samples are determined in relation to frequency $f_1$, in an alternative any suitable number of charge samples may be determined in relation to frequency $f_1$ and $f_2$, i.e. one or more charge samples for each frequency. For example, three, or five, or six, etc charge samples may be determined for each frequency, each having appropriate accumulation periods of suitable portions of the laser modulation signal.

The invention claimed is:

1. A continuous wave time of flight (CW-ToF) camera system comprising:
a laser configured to output laser light;
an imaging sensor comprising a plurality of imaging pixels configured to accumulate charge based on incident light comprising reflected laser light; and
an image acquisition system coupled to the imaging sensor and configured to:
acquire a first set of charge samples from the imaging sensor, wherein to acquire the first set of charge samples, the image acquisition system is further configured to:
a) drive the laser to output laser light modulated with a first modulation signal, wherein the first modulation signal has a first frequency; and b) read out image sensor values indicative of charge accumulated by at least some of the plurality of imaging pixels of the imaging sensor;
acquire a second set of charge samples from the imaging sensor, wherein to acquire the second set of charge samples, the image acquisition system is further configured to:
c) drive the laser to output laser light modulated with a second modulation signal, wherein the second modulation signal has a second frequency, and wherein the second frequency is greater than the first frequency; and
d) read out image sensor values indicative of charge accumulated by at least some of the plurality of imaging pixels of the imaging sensor; and
determine a depth frame based on the first set of charge samples and the second set of charge samples;
wherein the CW-ToF camera system operates in a relatively low energy mode during acquisition of the first set of charge samples compared with the acquisition of the second set of charge samples, and
wherein the image acquisition system, while in the relatively low energy mode, is further configured to drive the laser such that an optical power of the output laser light modulated with the first modulation signal is lower than an optical power of the output laser light modulated with the second modulation signal.

2. The CW-ToF camera system of claim 1, wherein the image acquisition system, while in the relatively low energy mode, is further configured to:
read out image sensor values from a first set of imaging pixels of the imaging sensor;
read out image sensor values from a second set of imaging pixels of the imaging sensor;
wherein the first set of imaging pixels comprises fewer imaging pixels than the second set of imaging pixels.

3. The CW-ToF camera system of claim 1, wherein the image acquisition system, while in the relatively low energy mode and when acquiring the first set of charge samples, is further configured to:
bin the image sensor values of groups of two or more imaging pixels, such that each of the first set of charge samples comprises a plurality of binned pixel values.

4. The CW-ToF camera system of claim 3, wherein to read out the image sensor values as part of acquisition of the first set of charge samples, the image acquisition system is further configured to:
bin, in the analog domain, image sensor values of groups of two or more imaging pixels; and
digitally convert the plurality of binned pixel values.

5. The CW-ToF camera system of claim 1, wherein to read out image sensor values indicative of charge accumulated by at least some of the plurality of imaging pixels of the imaging sensor, the image acquisition system is further configured to:
bin, in the charge domain, charge from two or more imaging pixels of the plurality of imaging pixels of the image sensor;
wherein each of the read out image sensor values is indicative of a combined charge of two or more imaging pixels.

6. The CW-ToF camera system of claim 1, wherein the image acquisition system is further configured to determine a depth frame based on the first set of charge samples and the second set of charge samples, and wherein determining the depth frame comprises up sampling the first set of charge samples.

7. The CW-ToF camera system of claim 1, the image acquisition system is further configured to determine a depth frame based on the first set of charge samples and the second set of charge samples, and wherein to determine the depth frame, the image acquisition system is further configured to:

determine phase differences between the output laser light modulated with a first modulation frequency and light incident on the imaging sensor based on the first set of charge samples; and upsample the determined phase differences between the output laser light modulated with a first modulation frequency and light incident on the imaging sensor.

8. The CW-ToF camera system of claim 1, wherein the image acquisition system comprises one or more amplifiers for amplifying signals read from the imaging sensor, and wherein the image acquisition system is configured to:

operate at least some of the one or more amplifiers in a first power mode when acquiring the first set of charge samples; and operate at least some of the one or more amplifiers in a second power mode when acquiring the second set of charge samples, wherein the first power mode is lower than the second power mode.

9. The CW-ToF camera system of claim 1, wherein the image acquisition system comprises one or more analog-to-digital converters (ADC) configured to convert analog signals read from the imaging sensor to digital signals, and wherein the image acquisition system is configured to:

operate at least some of the ADCs in a first power mode when determining at least some of the first set of samples; and operate at least some of the ADCs in a second power mode when determining at least some of the second set of samples, wherein the first power mode is lower than the second power mode.

10. The CW-ToF camera system of claim 1, wherein the image acquisition system, while in the relatively low energy mode, is further configured to:

repeating acquisition of the first set of charge samples a first plurality of times such that the acquired first set of charge samples comprises a first plurality of charge samples;

repeating acquisition of the second set of charge samples a second plurality of times such that the acquired second set of charge samples comprises a second plurality of charge samples;

wherein the first plurality is less than the second plurality, such that the first plurality of charge samples comprises fewer charge samples than the second plurality of charge samples.

11. The CW-ToF camera system of claim 1, wherein the image acquisition system, while in the relatively low energy mode, is further configured to:

driving the laser during the acquisition of the first set of charge samples and the acquisition of the second set of charge samples such that laser light is output from the laser during the acquisition of the first set of charge samples for a shorter period of time than laser light is output from the laser during the acquisition of the second set of charge samples.

12. The CW-ToF camera system of claim 1, wherein the image acquisition system is further configured to determine a depth frame based on the first set of charge samples and the second set of charge samples.

13. A method of obtaining a plurality of charge samples using a continuous wave ToF (CW-ToF) camera system comprising a laser and an imaging sensor having a plurality of imaging pixels for accumulating charge based on incident light, the method comprising:

acquiring a first set of charge samples from the imaging sensor by:

a) driving the laser to output laser light modulated with a first modulation signal, wherein the first modulation signal has a first frequency; and b) reading out image sensor values indicative of charge accumulated by at least some of the plurality of imaging pixels of the image sensor;

acquiring a second set of charge samples from the imaging sensor by:

c) driving the laser to output laser light modulated with a second modulation signal, wherein the second modulation signal has a second frequency, and wherein the second frequency is greater than the first frequency; and d) reading out image sensor values indicative of charge accumulated by at least some of the plurality of imaging pixels of from the image sensor, wherein the CW-ToF camera system operates in a relatively low power mode for acquiring the first set of charge samples compared with the acquiring of the second set of charge samples, and wherein the image acquisition system, while in the relatively low energy mode, is further configured to drive the laser such that an optical power of the output laser light modulated with the first modulation signal is lower than an optical power of the output laser light modulated with the second modulation signal.

14. The method of claim 13, further comprising determining a depth image based on the first set of charge samples and the second set of charge samples.

15. An image acquisition system for use in a continuous wave time of flight (CW-ToF) camera system, the image acquisition system configured to:

obtain a first plurality of charge samples by:

driving a laser to emit first laser light modulated with a first modulation signal; and reading out image sensor values from a first plurality of imaging pixels of an imaging sensor;

binning the image sensor values of groups of two or more imaging pixels such that each of the first plurality of charge samples comprises a plurality of binned pixel values;

obtain a second plurality of charge samples by:

driving the laser to emit second laser light modulated with a second modulation signal; and reading out image sensor values from a second plurality of imaging pixels of the imaging sensor, wherein the plurality of binned pixel values in each of the first plurality of charge samples is fewer in number than the plurality of image sensor values in each of the second plurality of charge samples, and wherein each of the first plurality of charge samples comprises fewer data points than each of the second plurality of charge samples.

16. The image acquisition system of claim 15, further configured to obtain the first plurality of charge samples by:

driving the laser to emit first laser light modulated with the first modulation signal for a plurality of periods of time;

for each of the plurality of periods of time, control the imaging sensor to accumulate charge on at least some of the imaging pixels for a portion of the modulation signal, wherein the portion of the modulation signal for which accumulation takes place has a different phase offset for each of the plurality of periods of time; and at the conclusion of each of the plurality of periods of time, obtaining one of the first plurality of charge samples by reading out image sensor values from the first plurality of imaging pixels.

17. The image acquisition system of claim 16, wherein the same set of imaging pixels of the imaging sensor are read out for each of the first plurality of charge samples.

18. The image acquisition system of claim 15, further configured to obtain the first plurality of charge samples by:

driving the laser to emit first laser light modulated with the first modulation signal for a period of time;

controlling, during the period of time, the imaging sensor to accumulate charge on a first set of imaging pixels for a first portion of the modulation signal;

controlling, during the period of time, the imaging sensor to accumulate charge on a second set of imaging pixels for a second portion of the modulation signal, wherein the second portion is the same duration of the modulation signal as the first portion but with a different phase offset; and at the conclusion of the period of time, reading out the first set of imaging pixels to obtain one of the first plurality of charge samples and reading out the second set of imaging pixels to obtain one of the second plurality of charge samples.

* * * * *